United States Patent
Ferrari et al.

(10) Patent No.: US 10,875,032 B2
(45) Date of Patent: Dec. 29, 2020

(54) METHOD FOR PRODUCING AGGREGATES FROM RETURNED CONCRETE

(71) Applicants: MAPEI S.P.A., Milan (IT); HOLCIM TECHNOLOGY LTD, Jona (CH)

(72) Inventors: Giorgio Ferrari, Milan (IT); Alberto Brocchi, Milan (IT); Marco Squinzi, Milan (IT); Francesco Carbone, Milan (IT); Vittorio Franceschi, Milan (IT); Paolo Antonio Zambianchi, Milan (IT)

(73) Assignee: MAPEI S.P.A., Milan (IT)

( * ) Notice: Subject to any disclaimer, the term of this patent is extended or adjusted under 35 U.S.C. 154(b) by 0 days.

(21) Appl. No.: 16/619,113

(22) PCT Filed: Jun. 6, 2018

(86) PCT No.: PCT/EP2018/064836
§ 371 (c)(1),
(2) Date: Dec. 4, 2019

(87) PCT Pub. No.: WO2018/224523
PCT Pub. Date: Dec. 13, 2018

(65) Prior Publication Data
US 2020/0094263 A1 Mar. 26, 2020

(30) Foreign Application Priority Data
Jun. 8, 2017 (IT) .................. 102017000063208

(51) Int. Cl.
*B03B 9/06* (2006.01)
*B03B 1/04* (2006.01)
(Continued)

(52) U.S. Cl.
CPC ............ *B03B 9/063* (2013.01); *B03B 1/04* (2013.01); *C04B 18/022* (2013.01); *C04B 18/167* (2013.01); *C04B 20/02* (2013.01)

(58) Field of Classification Search
CPC ........ B03B 9/063; B03B 1/04; C04B 18/022; C04B 18/167; C04B 20/02
(Continued)

(56) References Cited

U.S. PATENT DOCUMENTS

| 2007/0173568 A1* | 7/2007 | Nishikawa | C04B 24/2647 524/5 |
| 2015/0232381 A1* | 8/2015 | Niven | C04B 7/02 106/709 |
| 2017/0320775 A1* | 11/2017 | Kurz | C04B 40/0039 |

FOREIGN PATENT DOCUMENTS

| DE | 2617837 A1 | 11/1977 | |
| EP | 2930267 A1 * | 10/2015 | ........... E01C 19/002 |

(Continued)

OTHER PUBLICATIONS

Search Report and Written Opinion of PCT/EP2018/064836 dated Oct. 2, 2018.

*Primary Examiner* — Terrell H Matthews
(74) *Attorney, Agent, or Firm* — Silvia Salvadori, P.C.; Silvia Salvadori

(57) ABSTRACT

The present invention relates to a method for producing aggregates from concrete residues which are not used for construction purposes or, more generally, from cement mixtures which are unused for any reason and returned to the production facility in the truck mixer. The present invention also relates to the material obtained by said process and its use as an aggregate for concrete production or other applications.

17 Claims, 1 Drawing Sheet

(51) Int. Cl.
*C04B 18/02* (2006.01)
*C04B 18/16* (2006.01)
*C04B 20/02* (2006.01)

(58) Field of Classification Search
USPC .......................................................... 209/5
See application file for complete search history.

(56) References Cited

FOREIGN PATENT DOCUMENTS

| | | | | |
|---|---|---|---|---|
| JP | 2009126761 | * | 6/2009 | ............. C04B 24/26 |
| JP | 2009126761 A | | 6/2009 | |
| WO | 2012084716 A1 | | 6/2012 | |
| WO | WO-2016071298 A1 | * | 5/2016 | ............. C04B 12/04 |
| WO | 2016198384 A1 | | 12/2016 | |
| WO | WO-2016198384 A1 | * | 12/2016 | ......... C04B 24/2652 |

* cited by examiner

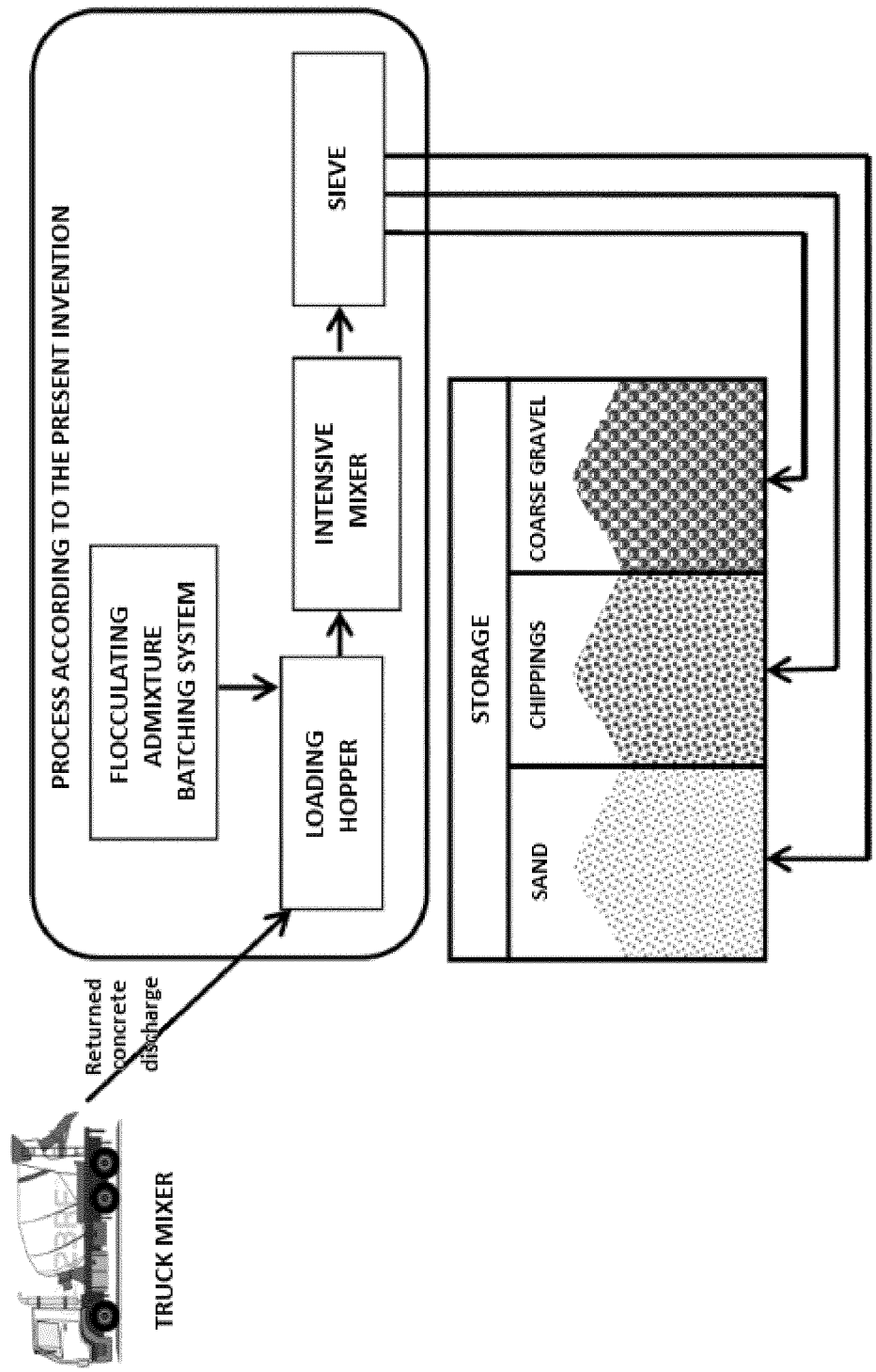

METHOD FOR PRODUCING AGGREGATES FROM RETURNED CONCRETE

This application is a U.S. national stage of PCT/EP2018/064836 filed on 6 Jun. 2018, which claims priority to and the benefit of Italian Application No. 102017000063208 filed on 8 Jun. 2017, the contents of which are incorporated herein by reference in their entireties.

The present invention relates to a method for producing aggregates from concrete residues which are not used for construction purposes or, more generally, from cement mixtures which are unused for any reason and returned to the production facility in the truck mixer. The present invention also relates to the material obtained by said process and its use as an aggregate for concrete production or other applications.

DESCRIPTION OF STATE OF THE ART

Concrete is the most widely used material in the world. It is estimated that 23 million tons of concrete are produced every year, the majority in widely distributed concrete-making facilities. Concrete is transported in truck mixers from said facilities to the sites of use, where it is discharged and placed.

Very often, the load of concrete is not fully discharged but a residue remains, ranging from half a cubic meter to 3-4 cubic meters, which is returned to the production facility in the truck mixer. The reason for said excess over the amount necessary for correct concrete placing is due to the fact that the client prefers to order a surplus of material rather than risk a deficit, which may interrupt and delay the correct performance of the work. In other cases, the concrete delivered may fail to comply with the product specifications (slump, temperature, etc.); in such cases, the material is rejected by the customer and the cement mixer returns to the manufacturing facility with its entire load of concrete (up to 8 cubic meters).

The proportion of undelivered concrete is known as "returned concrete", and varies from country to country. It is estimated that returned concrete represents about 2-3% of the entire production in European countries and in Japan, whereas in the USA the percentage rises to 5%. These figures indicate that a considerable amount of concrete produced, estimated at over 600,000 tons per annum, is not used.

It is not always possible for returned concrete that returns fresh to the production facility to be recycled and delivered to other customers, because 2-3 hours after production, cement hydration processes cause a gradual loss of workability and the start of the concrete hardening reactions, so that the concrete must be discharged from the truck mixer and remains at the facility, thus constituting a serious managerial and environmental problem. In fact, in most cases, the returned concrete is disposed of as special waste, with consequent wastage of resources, a high environmental impact and high costs.

New European legislation was recently issued which discourages sending industrial waste to landfill; European Directive 2008/98/CE states that landfilling must be considered the last option for waste treatment, and that recovery and recycling of construction waste must be increased by at least 70% by 2020. For these reasons, there is considerable interest in and commitment to avoiding the disposal of returned concrete, and numerous treatments for its recovery have been proposed.

DE 3906645 describes equipment for washing returned concrete which consists of a mixer wherein the returned concrete is mixed with a large amount of water. The coarse aggregates and sand, separated from the cement, are extracted from the mixer by a screw in the washing tank, and transferred to a storage area to be reused for producing new concrete. The dilute suspension of cement and the other fine fractions are sedimented, and the clarified water can be partly reused as mixing water for the production of new concrete. This system allows recovery and recycling of the coarse aggregate and sand, but presents considerable drawbacks. Firstly, waste production is not eliminated. In fact, the settled sludge that forms cannot be recovered, and must be periodically removed from the tank and disposed off. Secondly, large volumes of water are required to wash concrete, ranging from 1 to 2 cubic meters of water per cubic meter of concrete. Only a fraction of such water can be recycled and reused, due to the presence of dissolved salts and solids in suspension that interfere with the cement hydration reaction. The excess water that cannot be reused as mixing water for the production of new concrete must therefore be suitably treated before discharge, leading to a further cost increase.

Numerous methods of treating returned concrete, based on the use of substances able to absorb and immobilize large amounts of free water, have recently been proposed. By adding said substances or mixtures of substances directly to the truck mixer containing the returned concrete and mixing the cement mixer for a few minutes, typically 3 to 10 minutes, said substances absorb free water from the returned concrete and swell, forming a "gel", which incorporates the cement and the finer fractions of the mix in its structure; under the effect of the rotation of the truck mixer drum, the composite material formed by the "gel", the cement paste and the fine fractions covers the coarser aggregates, forming a millimeter layer of variable thickness. The result is that the returned concrete is transformed into a multitude of spherical granules of varying sizes, formed by an aggregate that constitutes the central core and an outer coating formed by the cementitious gel. When the granule formation process is complete, the material thus formed is discharged onto the ground by reversing the direction of rotation of the truck mixer drum. The fresh granules are sufficiently compact to be accumulated and stored to complete the cement hydration and hardening reactions. Once hardened, the granular material produced from the returned concrete can be reused as roadbed material or as an aggregate to produce new concrete, partly or wholly replacing natural aggregates.

These treatment methods have the great advantage of not producing waste. In fact, all the returned concrete present in the truck mixer is transformed into the new granular material, without leaving any kind of liquid or solid residue.

In Japanese Utility Model 3147832, the water-absorbing substances useful for the treatment consist of powdered copolymers formed by copolymerization of monomers, such as (meth)acrylic acid and the salts thereof, acrylamide, vinyl alcohol, vinylpyrrolidone, styrene sulphonic acid salts and maleic anhydride. To make their use safer and facilitate batching, the water-absorbing substances are enclosed in sealed water-soluble paper bags to be inserted in the drum of the truck mixer containing the returned concrete. The material produced, consisting of a set of granules, each constituted by an aggregate coated with a mixture containing cement and water-absorbing polymer, can be used as roadbed material.

WO2012/084716 discloses a method for the production of aggregates from returned concrete which involves adding a setting accelerator and a super-absorbent polymer to a fresh cement composition and mixing the whole until a granular material forms. The setting accelerators claimed include sodium silicate and substances able to form aluminate hydrates in the presence of cement, such as calcium aluminate, aluminium sulphate, sodium aluminate, alumina cement or mixtures thereof, while in the case of super-absorbent polymers, those based on polyacrylamide modified with acrylic acid are indicated as being particularly effective. The setting accelerators and super-absorbent polymers can be added separately or mixed in a single product. The granular materials thus formed can be used as roadbed material, concrete aggregates, decorative elements for roads and gardens, and substitutes for natural stone.

WO2016/198384 discloses a method for producing aggregates by mixing fresh cementitious mixtures, including returned concrete, with pelletizing agents comprising cellulose, chitosan, collagen, polyacrylamide and co-polymers of polyacrylamide and polyacrylics, polyamines, polyvinyl alcohol, polysaccharides, lactic acid, methacrylic acid, methacrylates, hydroxyethyl acrylates, ethylene glycol, ethylene oxide, acrylic acid, inorganic flocculants and inorganic coagulants. The resulting fresh granular material is discharged and accumulated in suitable dedicated areas for as long as required for its curing and hardening. The curing period depends on the temperature, and falls between two intervals: a minimum value $t_1$ before which the granules cannot be processed because they are too soft, and a maximum value $t_2$ over which the granules can no longer be processed due to their irreversible agglomeration. The material can be processed by hand or with suitable mechanical means, which allow the material to be crushed and transported to other storage areas in the concrete production facility.

WO2016/071298 relates to a method for the production of aggregates from non-hardened cement compositions, in particular from returned concrete, which comprises adding a water-absorbing agent and a crystallisation deactivator to a non-hardened cement composition, and mixing until a granular material has formed. The water-absorbing agents cited include super-absorbent polymers, which may be natural or synthetic, and phyllosilicates, in particular vermiculite. The crystallisation deactivators cited include lactic acid, citric acid and malic acid.

All the methods proposed to date present multiple drawbacks, which strongly limit their applicability in the industrial field and discourage the recovery of returned concrete, with the result that sending to landfill is still the most common practice.

In particular, the granular material produced must be accumulated until the fresh granules develop sufficient mechanical strength for their transformation and transfer to the storage area. Moreover, the proper processing time is closely correlated with the environmental conditions, as described in detail in WO2016/198384. In winter and in countries with cold climates, the residence times of the material prior to processing can be very long. As shown in the graph in FIG. 3 of patent application WO2016/198384, in the case of a granular cementitious material produced from returned concrete stored at 0° C., the curing time is between 2 and 3 days. This means that large areas for temporary storage of the material produced from returned concrete are required, and such areas are not always available in concrete manufacturing facilities. Conversely, in the opposite climatic conditions, the curing times required can be too short to allow effective processing of the granular material. For example, a granular material produced from returned concrete at 2 p.m. and stored at 35° C., conditions typical of the summer season and equatorial zones, must be handled not before midnight and not after 5 a.m. on the next day, which means that the facility's personnel must be present at night, leading to an increase in running costs. The need for overtime work also arises in the case of granular material produced on Friday afternoons which, if stored under ordinary climatic conditions (between 10 and 25° C.), must be handled between Saturday and Sunday, on which days concrete-making facilities are normally closed.

The second critical aspect of production of granular material from returned concrete that arises in the processes described above is that the granulate produced invariably has a dispersed particle-size distribution which, apart from the finer fractions, is very similar to the particle-size distribution curve of the aggregates (gravel, chippings and sand) used for the production of the original concrete. This means that the granular material, once hardened, cannot be stored with the natural aggregates normally used for concrete production, which are divided into well-defined particle-size classes, but must necessarily be stored separately, thus requiring further space inside the facility. Moreover, the particle-size distribution of the granular material, which closely resembles that of the original aggregates, facilitates the maximum degree of particle packing; the granular material consequently has a very low tendency to flow, and therefore cannot be stored in silos pending batching in the concrete production facility, because it would clog the feed pipes.

The third critical aspect relates to the granulation process, which in the case of returned concrete is conducted directly in the truck mixer on return to the site. Apart from the time required to complete the granulation process, which ranges between 5 and 15 minutes, the time required to discharge the granulate onto the ground must also be considered, as its duration depends on the returned concrete content of the truck mixer. The discharge stage can last for 10 to 15 minutes if the initial load of returned concrete is 1-2 cubic meters, and can exceed 40 minutes if the cement mixer returns from the site with the maximum returned concrete load of 8-10 cubic meters. Throughout this time the truck mixer is busy and unavailable for loading new concrete, thus seriously limiting the productivity of the production facility.

Another adverse aspect of the returned concrete treatment method developed to date relates to the quality of the granular material produced. In fact, the cement paste that constitutes the outer coating of the new granules is porous, and absorbs considerable amounts of water. Consequently, when said aggregates are used instead of natural aggregates for the production of new concrete, the mixing water must be considerably increased to compensate for the higher water absorption. The increase in the water/cement ratio of the new concrete, due to the new aggregates, invariably produces a reduction in the mechanical properties and durability of the new concrete. This aspect limits the possibility of producing concrete with high mechanical properties and good durability from granular materials obtained by the returned concrete treatment methods developed to date.

BRIEF DESCRIPTION OF THE DRAWINGS

FIG. 1 shows a scheme of returned concrete treatment process according to the present invention.

DESCRIPTION OF THE INVENTION

The present invention relates to a novel method for treating returned concrete which eliminates all the drawbacks of the methods proposed to date. In particular, the method of the invention transforms returned concrete into new aggregates and, unlike the methods proposed to date, does not require an intermediate curing process, as they can be sorted immediately on the basis of particle size and stored immediately at the final site. As the process takes place in a dedicated unit, the truck mixer is immediately available to take a new load of concrete, without penalising the production process in any way. Moreover, the novel method does not use water and does not produce any kind of liquid or solid waste. Finally, the quality of the aggregates produced by the method of the invention is far better than that of the granular materials obtained with the systems proposed to date. This means that aggregates produced by the method of the invention can be used for the production of concretes characterised by high mechanical properties and high durability.

The invention also relates to the aggregates obtainable by said process and their use for the production of cement mixes.

The method of the invention is not based on granulation of the returned concrete, as described in all the methods proposed to date. It has now surprisingly been found that by subjecting the returned concrete to intensive mixing in the presence of organic or inorganic flocculants admixtures, the aggregates can be separated from the fine fraction and water, and the aggregates can be immediately recovered in their original form and condition, substantially dry and not coated with cement material. This aggregate "peeling" process is the opposite of the granulation process described in the documents previously cited, which claim to obtain a material consisting of a set of granules, each formed by a central core represented by the coarse aggregate to which a surface layer adheres, said layer consisting of the cement paste and the fine fractions of the mix. The "peeled" natural aggregates produced by the method of the invention at the end of the intensive mixing process are completely separated from the rest of the mix, are substantially dry and not coated with cement paste; they are immediately sieved and sorted on the basis of the desired particle size, and sent to the aggregate storage depots of the facility.

The remaining fraction of returned concrete, represented by sand, cement and water, under the effect of the coagulant admixtures and intensive mixing, is transformed into a mixture of small agglomerates (a few millimetres), which are separated from the coarser aggregates in the subsequent sieving process. Due to the strong cohesive action of the coagulant admixtures and the homogenous, uniform particle-size distribution, the fine fraction originating from the process, still wet, has little or no tendency to agglomerate, and there is therefore no need for a curing stage before its final storage, whereas curing is necessary in granulation processes, as described in WO 2016/198384. Consequently, the mixture of fine agglomerate can also be sent directly to the sand depot of the facility wherein, due to mixing with the dry material already present, it is evenly dispersed. The entire process is conducted in a dedicated unit into which the truck mixer discharges the returned concrete; the truck mixer is therefore not involved in the transformation process and can be immediately reused for new loads of concrete, without penalising the production cycle. The method of the invention is defined in claim 1. The preferred aspects of the invention are defined in the dependent claims. The scheme of the method is summarized in the FIGURE, which depicts a scheme of returned concrete treatment process according to the present invention.

The truck mixer discharges the returned concrete into a loading hopper at the facility, positioned on loading cells for measurement of the amount of concrete delivered, with a system for measuring the slump of the mix. The returned concrete is then transferred into the mixer, wherein the flocculating admixtures are added, the batching of which is regulated on the basis of the amount of returned concrete to be treated and its slump characteristics. The intensive mixer is a horizontal-axis mixer wherein the returned concrete, with the addition of flocculating admixtures, is broken down into the original aggregates and the coagulated fine fraction. Due to the high shear stress imparted by the rotary shaft and the effect of the flocculating admixtures, the lumps of cement paste, consisting of water, admixtures and fine sandy fractions of returned concrete, instead of being deposited on the surface of the coarse aggregates and giving rise to granules wherein the coarse aggregate is coated with a layer of cement "gel", as described in the earlier patent literature, are continually detached from the surface and remain separate at the end of process, in the form of coagulated agglomerates with a size of a few millimeters (typically 1 to 5 millimeters).

The duration of the mixing process ranges between 20 seconds and 5 minutes, preferably between 30 seconds and 3 minutes, and most preferably between 1 minute and 2 minutes. Shorter times do not allow the flocculating admixtures to act completely, whereas longer times destabilize the flocculation process and cause the mix to re-agglomerate. The mixer can be the single-shaft or twin-shaft type, with hammer or paddle mixers or both. The end of the shaft can be fitted with a screw to facilitate the advance of the material along the mixer.

On exit from the intensive mixer, the mixture of treated returned concrete, consisting of coarse aggregates and lumps of fine fraction consisting of water, cement paste, fine fractions and coagulant admixtures, is passed to the sieving system for separation of the various fractions. The crude mixture is separated into at least two fractions: the first corresponding to coarse aggregates larger than 5 mm, and the second to the finer fraction smaller than 5 mm. It is preferably separated into three fractions: the first corresponding to coarse aggregates larger than 10 mm, the intermediate fraction corresponding to aggregates with a size between 10 mm and 5 mm, and the finer fraction to aggregates smaller than 5 mm. However, the number of fractions collected and their particle size can be varied within a wide range by increasing the number of sieves and modifying their aperture.

The types of sieve used for the process of producing aggregates from returned concrete according to the invention are common industrial vibration, rotary or cyclone sieves, able to separate the aggregates on the basis of the selected particle size. The separators can be made of plastic or metal, with variable geometry and hole size. The quality of the separated material is further improved if an airstream in counter-current to the flow of aggregates in the sieve is blown in during the sieving process. The action of the air is designed to further dry the surface of the coarse aggregates, releasing it from any residues of the cementitious phase, and the surface of the coagulated material, facilitating the separation process and improving the quality of the aggregate. The airflow is produced by a ventilation system wherein the air can also be heated to facilitate drying of the material in the winter months and in cold climates.

The larger fractions, typically those exceeding 10 mm and those ranging between 5 and 10 mm, are almost free of cement paste on the surface. The residual portions of coagulated mortar adhering to the surface of the aggregates produced by the method according to the present invention can represent up to 1% of the total mass of aggregates larger than 10 mm and up to 5% of the total mass of aggregates of intermediate size (5 to 10 mm), without in any way prejudicing the possibility of successfully conducting correct sieving of the material output from the intensive mixer and its subsequent storage.

At the outlet of the sieving system, the fractions of aggregate produced are sent directly to the storage depots. The surface of the coarse aggregates produced by the method according to the invention, typically those larger than 5 mm, are dry and substantially devoid of surface deposits of cement paste, and can be directly stored with natural aggregates having the same particle-size characteristics. The fine fraction, smaller than 5 mm and mainly consisting of lumps containing water, coagulant admixtures, fresh cement and the fine fractions of the mix (sand and silt), is sufficiently cohesive to be sent directly to the sand depot, wherein it is dispersed in the mass of material already stored. To improve handling in the fresh state before storage, the fine fraction just produced can optionally be mixed with a sufficient amount of dry sand or already hardened fine material, previously produced.

The organic flocculating admixtures can consist of anionic and cationic polyelectrolytes, which can be batched in either solid or liquid form. Examples of said admixtures are polyacrylamides modified with anionic or cationic groups, with a variable charge density and molecular weights ranging between a few tens of thousands and 20 million Daltons. The solid products consist of a powder of variable particle size, ranging between 1000 μm and 0.1 μm, preferably between 500 μm and 0.5 μm, and most preferably between 200 μm and 1 μm. The liquid products are emulsions, wherein the active substance content can range between 10% and 80%, preferably between 20% and 70%, and most preferably between 25% and 60%. Other organic flocculants are represented by high-molecular-weight polysaccharides such as cellulose and derivatives thereof, starch and derivatives thereof. The typical dose of organic flocculants can range from 0.1 to 10 kg, preferably from 0.2 to 3 kg, and most preferably from 0.4 to 2 kg of product per cubic meter of returned concrete to be treated. Said admixtures can be used alone or combined with other inorganic flocculating admixtures.

Inorganic flocculants, which can optionally be used in combination with the organic flocculants described above, consist of trivalent metal salts, such as Aluminium (III) and Iron (III) salts. The most commonly used are aluminium sulphate $Al_2(SO4)_3$, sodium aluminate $NaAlO_2$, potassium alum $KAl(SO_4)_2$, aluminium polychloride $Al_n(OH)_mCl3_{n-m}$, ferric chloride $FeCl_3$ and ferric sulphate $Fe_2(SO_4)_3$. The typical dose of inorganic flocculants ranges between 0.5 kg and 15 kg, preferably between 0.6 kg and 10 kg, and most preferably between 1 kg and 7 kg of product per cubic meter of returned concrete to be treated, and can be batched in solid or liquid form.

The organic and inorganic flocculating admixtures of the invention can also be formulated and used in combination with normal concrete admixtures such as accelerant admixtures and retardant admixtures. Examples of accelerant admixtures include calcium nitrate, mixtures of silicate hydrates, sodium thiocyanate, ethanolamines, calcium formate, calcium acetate and mixtures thereof. Examples of retardant admixtures include alkaline and alkaline-earth salts of citric, lactic, malic and oxalic acids and, more generally, of the other α-hydroxycarboxylic acids.

The method for the production of aggregates from returned concrete according to the invention can be conducted either discontinuously or continuously. In the discontinuous process, the returned concrete discharged from the truck mixer is weighed and fed into the intensive mixer, wherein it is treated for the established time, in the presence of the coagulant admixtures. At the end of the intensive mixing process, the crude mixture of aggregates is transferred to the sieving unit, and the separated aggregates are sent to the respective storage depots. The discontinuous process is particularly suitable for treating small amounts of returned concrete, ranging from half a cubic meter to 3 cubic meters, which can be contained in an intensive mixer that is not excessively large. For larger amounts, to avoid the use of excessively large intensive mixers, the continuous process is more advantageous. In that case, the returned concrete is fed into the intensive mixer continuously, at such a rate as to allow a residence time sufficient to effectively implement the correct treatment with the coagulant admixtures. By suitably calculating the residence time, the volume of the intensive mixer can be limited, thus avoiding the use of excessively large and expensive discontinuous mixers. The crude mixture of aggregates is conveyed from the intensive mixer to the sieving system which, again continuously, separates the mixture into the various particle-size fractions. In the case of the continuous process, horizontal-axis intensive mixers wherein the shaft is fitted with intensive mixing components (hammers, ploughs or paddles) and components for the advance and transfer of the mixture (screw), are particularly suitable.

The invention is described in greater detail in the following examples.

Example 1

2 cubic meters of returned concrete having the characteristics specified in Table 1 were loaded into a double-shaft intensive mixer with a usable capacity of 3 cubic meters. After the concrete was loaded into the mixer, 2 kg of an organic powdered flocculating admixture based on anionic polyacrylamide was added, and said substances were mixed for 1 minute 30 seconds. At the end of mixing, the crude material was discharged and separated in a vibration sieve consisting of 1 separator with an aperture of 5 mm. Two fractions were thus obtained: the first represented by aggregates larger than 5 mm, and the second represented by the material that passed through the 5 mm sieve, and collected on the bottom. The characteristics of the various fractions are shown in Table 2.

As will be seen from the results of Table 2, the most abundant fraction (54% of the total mass of the aggregates produced) is the finest (fraction <5 mm) containing, in the form of lumps, the cement, water, the finer fractions of the original concrete and the flocculants. The other fraction consists mainly of the natural aggregates that originally constituted the concrete (46% of the total). As will be seen, Fraction 1 is practically free from cement residues (only 0.1% of residual mortar attached), demonstrating the excellent efficacy of the coagulation and separation process. These characteristics have a favorable impact on the other characteristics of the aggregates, especially the mass volume and the water absorption, which are very similar to those of the natural aggregates used for the production of the original concrete.

TABLE 1

Characteristics of returned concrete

| Ingredient/Parameter | Unit of measurement | Value |
|---|---|---|
| Type of cement CEMII/A-LL | UNI-EN 197-1:2006 | CEMII/A-LL |
| Dosage of cement | kg/m³ | 300 |
| Gravel 20/30 | kg/m³ | 477 |
| Gravel 10/20 | kg/m³ | 308 |
| Sand 0/8 | kg/m³ | 916 |
| Water | liters/m³ | 197 |
| Plasticizing admixture | liters/m³ | 1.8 |
| W/C ratio | | 0.64 |
| Slump class according to UNI-EN 206:2008 | | S4 |

TABLE 2

Characteristics of aggregates obtained with the method according to the present invention

| Parameter | u.m. | Fraction 1 ≽5 mm | Fraction 2 <5 mm |
|---|---|---|---|
| Relative quantity | % | 46 | 54 |
| Residual amount of mortar | % | 0.1 | — |
| Volume mass | kg/m³ | 2.70 | 2.35 |
| Water absorption | % | 1.0 | 7.3 |

Example 2 (Comparative)

In this example, the characteristics of the aggregates produced by the granulation method described in WO 2012/084716 are measured by way of comparison. Two cubic meters of returned concrete having the characteristics reported in Table 1 were treated in a truck mixer with 13 kg of powdered inorganic flocculant based on aluminium sulphate $Al_2(SO_4)_3$. After stirring in the cement mixer for 3 minutes, 1 kg of super-absorbent admixture based on anionic polyacrylamide was added, and stirring was continued for a further 4 minutes, until the returned concrete was transformed into a granular material. The granular material thus formed was discharged from the truck mixer and distributed in a thickness of about 20 centimeters. About 3 hours after discharge, the material was gently processed with a small mechanical device equipped with a paddle, to cleave the bonds formed between the granules due to the hydration of the cement. This operation was repeated 3 more times in the first 24 hours, and the granular material was then left to cure in a pile for 7 days, before being sieved through a sieve with a 5 mm mesh. The characteristics of the 2 fractions thus separated are set out in Table 3.

TABLE 3

Characteristics of aggregates obtained with the granulation method disclosed in patent application WO2012/084716 (Comparative)

| Parameter | u.m. | Fraction 1 >5 mm | Fraction 2 <5 mm |
|---|---|---|---|
| Relative quantity | % | 65 | 35 |
| Residual amount of mortar | % | 13.5 | — |
| Volume mass | kg/m³ | 2.44 | 2.36 |
| Water absorption | % | 5.5 | 9.5 |

As will be seen from the results shown in Table 3, Fraction 1, relating to the coarser particle size, is characterised by a 13.5% fraction of mortar adhering to the surface, much greater than that of the same fraction of Example 1. This characteristic inevitably affects the mass volume and the water absorption of said aggregates, which are much worse than the values of Fraction 1 of Example 1.

Example 3

In this example, the aggregates produced in Example 1 (Invention) and example 2 (Comparative) were used for the production of a concrete mix by comparison with a similar comparative mix, made solely with natural aggregates. In this example, the coarse aggregate fraction (>5 mm) and the medium-coarse sand fraction (<5 mm) of the natural aggregates were entirely replaced by the fractions of aggregates produced from returned concrete. In the concretes with aggregates produced from returned concrete, it was necessary to add an additional proportion of natural fine sand to balance the particle-size distribution curve of the aggregates.

The characteristics of the mixes are set out in Table 4 below.

TABLE 4

Composition and characteristics of concrete mixes used in Example 3

| Ingredient/Parameter | u.m. | Concrete 1 (reference) | Concrete 2 (invention) | Concrete 3 (comparative) |
|---|---|---|---|---|
| Cement IIA-LL 42.5R | Kg/m³ | 300 | 300 | 300 |
| Water | Kg/m³ | 197 | 205 | 244 |
| W/C ratio | | 0.64 | 0.68 | 0.86 |
| Superplasticising admixture | % bmc* | 0.8 | 0.8 | 0.8 |
| Natural sand | Kg/m³ | 147 | 350 | 405 |
| Fraction <5 mm | Kg/m³ | 916 | 763 | 420 |
| Fraction >5 mm | Kg/m³ | 785 | 735 | 825 |
| Slump | cm | 21 | 21 | 21 |
| Entrained air | % | 1.7 | 1.9 | 3.5 |
| Compressive strength after 24 hours | mpa | 12.1 | 12.1 | 10.6 |
| Compressive strength after 7 days | MPa | 28.4 | 26.2 | 23.1 |
| Compressive strength after 28 days | mpa | 34.4 | 32.2 | 30.2 |

*bmc = by mass of cement

As will be seen, the concrete made with the aggregates produced according to the present invention (Concrete 2) requires less mixing water and develops better mechanical compressive strength than the concrete made with the aggregates produced by the granulation process described in WO2012/084716 (Concrete 3). Said differences are mainly due to the different water absorption characteristics of the aggregates produced by the various methods, and confirm that the quality of the aggregates produced by the method according to the invention is much better than that of the aggregates produced by the granulation methods of treating returned concrete.

The invention claimed is:

1. A method for the production of aggregates from returned concrete which comprises:
   a) loading returned concrete into an intensive mixer;
   b) adding organic or inorganic flocculating admixtures, either alone or combined;
   c) mixing for 20 seconds to 5 minutes, until the returned concrete has coagulated into:
      i. a fraction of larger particle size, mainly consisting of the original natural aggregates contained in the returned concrete, which are substantially dry and free of cement paste;
      ii. a fraction of smaller particle size, mainly consisting of lumps containing water, coagulant admixtures, fresh cement and the fine fractions of the mixture (sand and silt);

d) passing the mixture through a vibration, rotary or cyclone sieve with separation into at least two particle-size classes, one fraction with a larger particle size mainly consisting of the original natural aggregates contained in the returned concrete, which are substantially dry and free of cement paste, and one fraction with a smaller particle size mainly consisting of lumps containing water, coagulant admixtures, fresh cement and the fine fractions of the mixture (sand and silt).

2. A method as claimed in claim 1 wherein the intensive mixer is the single-shaft or twin-shaft, continuous or discontinuous, horizontal-axis type, with mixing elements consisting of ploughs, hammers, paddles, screws or a combination thereof.

3. A method as claimed in claim 1 wherein the intensive mixer is the single-shaft or twin-shaft, continuous or discontinuous, vertical-axis type, with mixing elements consisting of paddles or blades.

4. A method as claimed in claim 1 wherein the sieve referred to in point d) separates the larger fraction, mainly consisting of the original natural aggregates contained in the returned concrete, which are substantially dry and devoid of cement paste, into two or more fractions with a particle size ranging between 5 mm and 40 mm.

5. A method as claimed in claim 1 wherein the smaller fraction, mainly consisting of lumps containing water, coagulant admixtures, fresh cement and the fine fractions of the mixture (sand and silt), has a particle size of less than 5 mm.

6. A method as claimed in claim 1 wherein the addition of stage b) is automatically regulated on the basis of the weight and slump of the returned concrete measured in the hopper.

7. A method as claimed in claim 1 wherein organic flocculants combined with inorganic flocculants are added at stage b).

8. A method as claimed in claim 1 wherein the organic flocculant is selected from polyacrylamides modified with anionic or cationic groups, in either solid form or liquid form, and the inorganic flocculant is selected from Al (III) or Fe (III) salts in either solid form or liquid form.

9. A method as claimed in claim 1 wherein the dose of organic flocculant ranges between 0.1 and 10 kg, of product per cubic meter of returned concrete to be treated.

10. A method as claimed in claim 1 wherein the dose of inorganic flocculant ranges between 0.5 and 15 kg of product per cubic meter of returned concrete to be treated.

11. A method as claimed in claim 1 wherein stage d) is conducted with a vibration sieve under counter-current air flow.

12. A method according to claim 1, wherein said step c) is carried on for 30 seconds to 3 minutes.

13. A method according to claim 1, wherein said step c) is carried on for 1 minute to 2 minutes.

14. A method according to claim 9, wherein the dose of organic flocculant ranges between 0.2 and 3 kg of product per cubic meter of returned concrete to be treated.

15. A method according to claim 9, wherein the dose or organic flocculant ranges between 0.4 and 2 kg of product per cubic meter of returned concrete to be treated.

16. A method as claimed in claim 10 wherein the dose of inorganic flocculant ranges between 0.6 and 10 kg product per cubic meter of returned concrete to be treated.

17. A method as claimed in claim 10 wherein the dose of inorganic flocculant ranges between 1 and 7 kg of product per cubic meter of returned concrete to be treated.

* * * * *